Feb. 13, 1962   R. E. RICHARDSON   3,021,227
METHOD AND APPARATUS FOR COATING GLASS
Filed Sept. 13, 1960   5 Sheets-Sheet 3

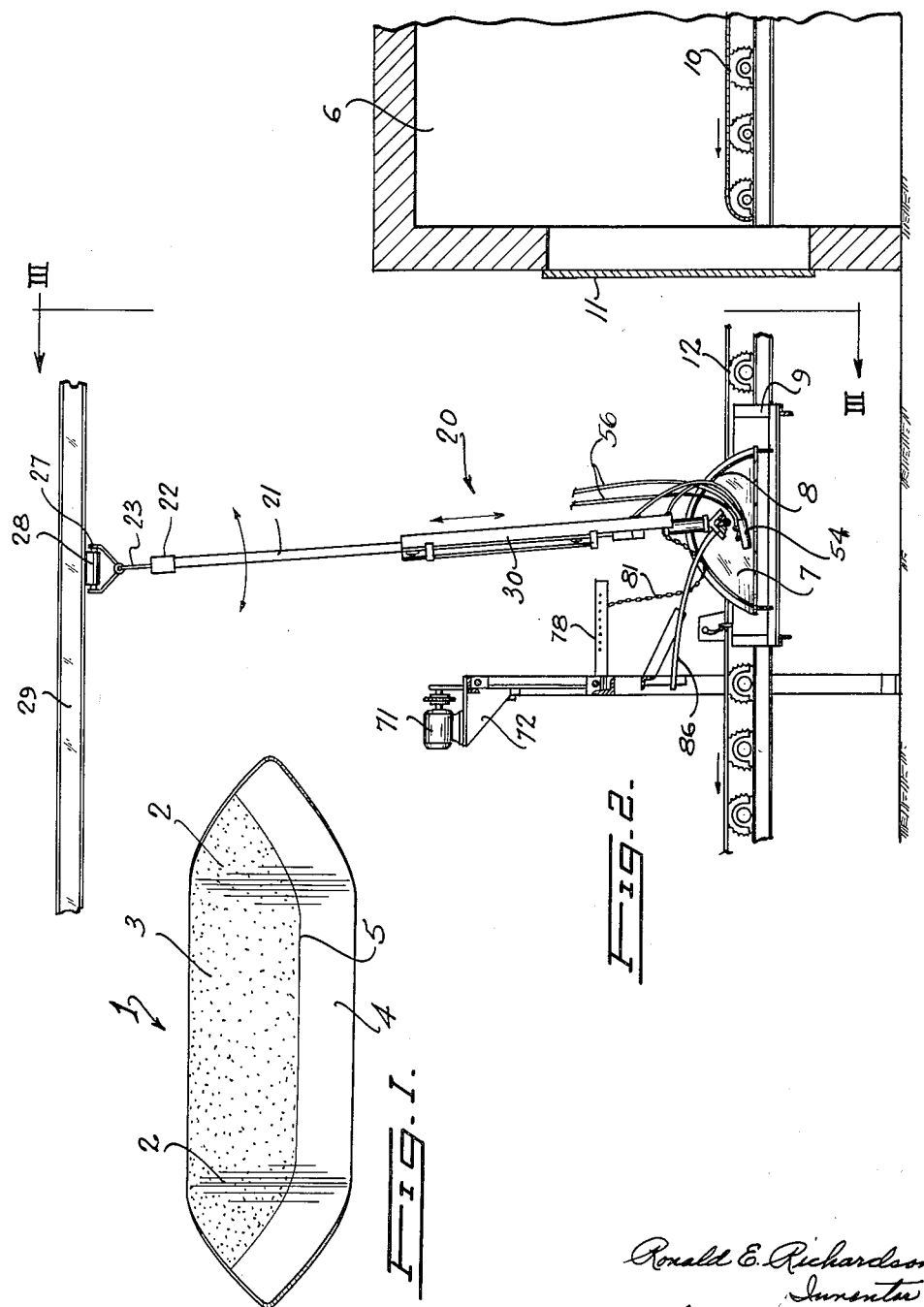

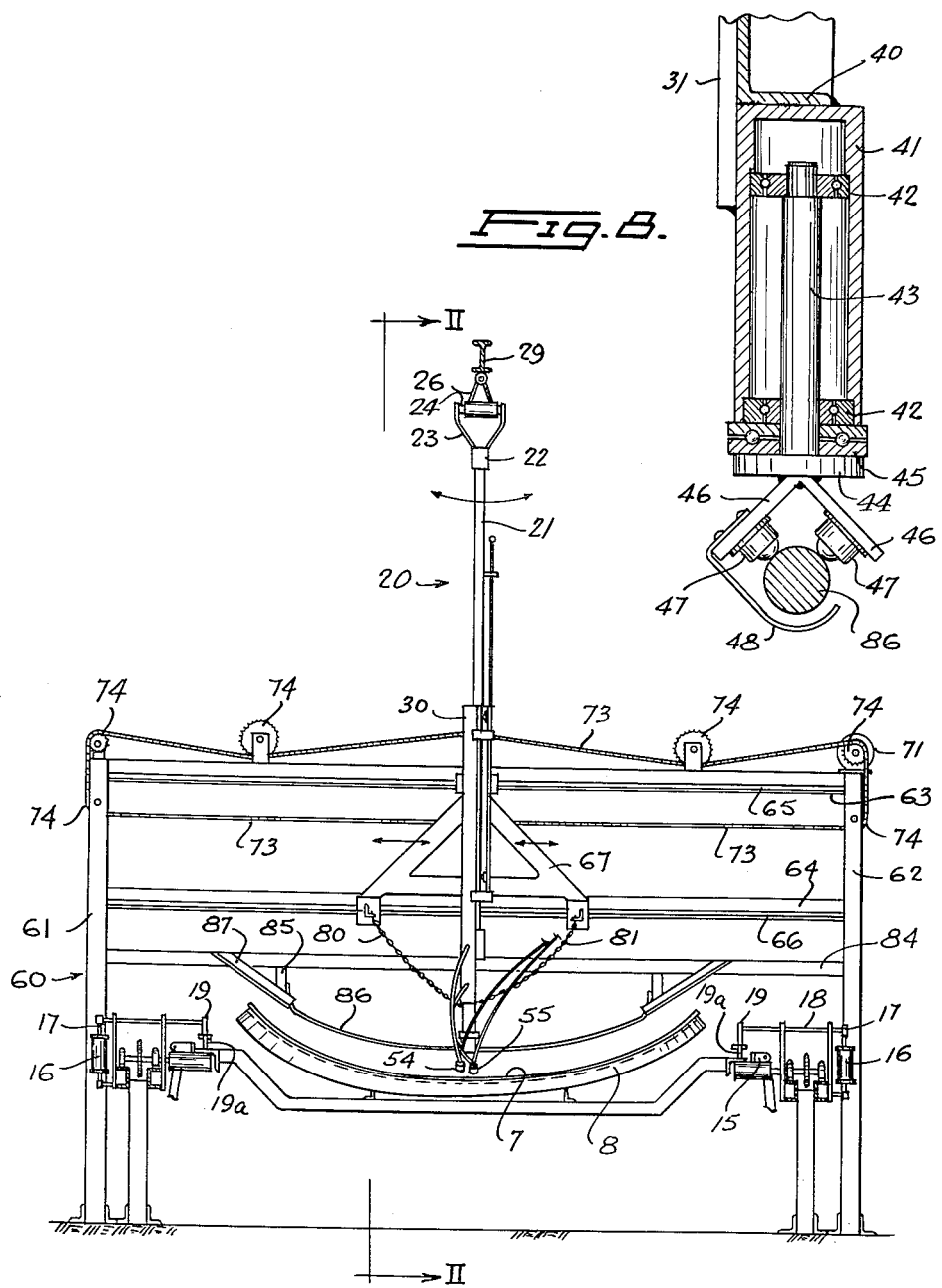

Ronald E. Richardson
Inventor
By Cushman, Darby & Cushman
Attorneys

Feb. 13, 1962
R. E. RICHARDSON
3,021,227
METHOD AND APPARATUS FOR COATING GLASS
Filed Sept. 13, 1960
5 Sheets-Sheet 4
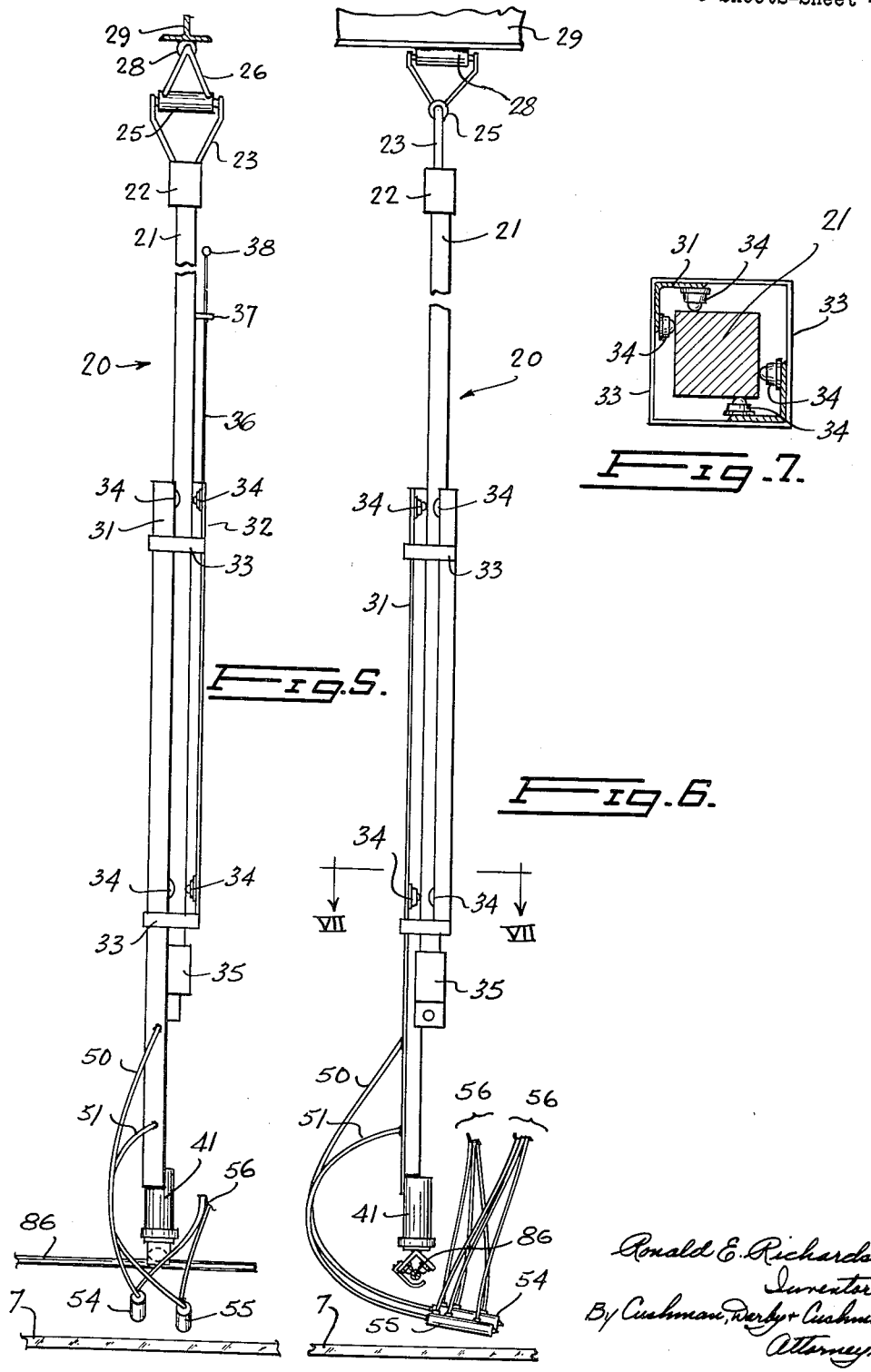

United States Patent Office 3,021,227
Patented Feb. 13, 1962

3,021,227
METHOD AND APPARATUS FOR COATING GLASS
Ronald E. Richardson, Oshawa, Ontario, Canada, assignor to Pittsburgh Plate Glass Company, Pittsburgh, Pa.
Filed Sept. 13, 1960, Ser. No. 55,742
Claims priority, application Canada June 8, 1960
12 Claims. (Cl. 117—37)

The present invention relates to the application of coatings to sheets of glass.

The invention is especially concerned with the partial coating of glass for use in automobiles. The present tendency in automobile design is to increase the size of windshields and backlights with a view to improving visibility. As the total area of glass installed in the automobile increases there is of course a corresponding increase in the amount of light transmitted to the interior of the automobile. Unfortunately in sunshine this gives rise to a rapid rise of temperature inside the automobile with consequent discomfort to the occupants. The side lights can normally be retracted into the framework of the automobile to provide some relief from this discomfort but the windshield and the backlights are usually fixed in position.

It has therefore become common practice to modify the transmission properties of the windshield and backlight so as to reduce the amount of infra-red radiation passing into the automobile. In case of a laminated windshield this is conveniently achieved by appropriate tinting of the interlayer. A backlight however is usually not laminated but is instead made of a single sheet of tempered glass. Tinting of a backlight is therefore effected by applying a coating to one of the surfaces of the glass. Since it is seldom desirable or necessary that the transmission characteristics of the entire backlight be modified the coating is generally applied only to the portion of the surface of the backlight which lies uppermost when the backlight is installed in an automobile.

Metal oxide coatings have high infra-red absorption combined with good transmission properties in the visible portion of the spectrum are especially desirable for such coatings. These metal oxide coatings are produced by heating a surface of a glass sheet to an elevated temperature and spraying a metal salt composition thereon. The metal salt hydrolyses into a metal oxide film upon contacting the heated glass sheet. For example, suitable films of cobalt oxide have been formed by spraying cobalt acetate compositions of the type described in U.S. Patent No. 2,688,565 to Richard F. Raymond, dated September 7, 1954. Other suitable compositions that form heat screening metal oxide films are disclosed in U.S. Patent No. 2,564,708 to John M. Mochel, dated August 21, 1951.

Since the coating utilized are sufficiently strongly coloured to be readily visible it is desirable, in order to provide an attractive appearance, that the cut-off line between the coated and the uncoated portion of the glass should be horizontal. In the case of backlights which have been bent so as to have end portions extending around the sides of the automobile this means that the cut-off line lies in a horizontal plane.

Prior to this invention it has been customary to produce a partially coated, curved backlight by applying a curved band of coating to the appropriate portion of the surface of a flat glass sheet, preferably cut to size, and then bending the sheet to give it the desired curvature. This bending of the glass after application of the coating has frequently impaired the properties of the coating by causing crazing thereof at the parts of the sheet most severely bent.

If the backlights were to be mounted vertically in the automobile it would be possible to achieve a horizontal cut-off line after installation by forming a straight cut-off line on the flat glass sheet. However, modern backlights are inclined from the vertical so that the cut-off line on the flat sheet has to be curved, the nature of this curvature depending on the angle of inclination of the backlight after installation. The delineation of an appropriately curved cut-off line on the flat sheet is achieved by means of a two-dimensional cam arrangement controlling a spray head by means of which a suitable coating composition is applied to the glass.

The simple operation involved in applying a curved band to a flat glass sheet cannot be employed to spray curved glass sheets. First of all, it has been found necessary in applying a band of coating to a curved glass sheet to move a spray head along a path that is curved in two dimensions. It is necessary that the path taken by the spraying means comprise a longitudinal component of motion curved in a direction parallel to the longitudinal curvature of the glass sheet as well as a transverse component of motion defining a curved path similar to that which a spray head is caused to follow by the two dimensional cam arrangement previously used for coating flat glass sheets.

However, the longitudinal curvature of the glass sheet to be sprayed presents still another problem not met in spraying a flat sheet because the uniformity of spray density along the path of intersection taken by the spray has been found to be a function of the angle formed between the spray axis and the surface sprayed. In spraying flat glass, the axis along which the spray is directed makes a substantially constant angle with each increment of flat surface it contacts during its curved or linear path of movement relative to the glass sheet. In order for the same criterion to apply for coating a curved sheet, it is necessary to adjust the orientation of the spray head so that the axis of the spray directed therefrom impinges on each increment of the glass sheet at a substantially constant angle while moving the spray head along said curved path.

An object of this invention is to provide partially coated, curved glass sheets displaying substantially less crazing of the coatings thereon than has normally resulted when such sheets have been produced by the methods of the prior art.

A further object of the invention is to provide a method of coating a portion of the surface of a curved glass sheet so as to provide a cut-off line of desired curvature between the coated portion and remainder of the glass sheet.

Another object of the present invention is to provide apparatus for spraying a band of coating on a surface of a curved glass sheet wherein the apparatus comprises spraying means, means for supporting a curved glass sheet in a position adjacent said spraying means, means operatively connected to the spraying means for moving said spraying means relative to the curved surface of the glass while applying a spray through said spraying means, guiding means curved in two dimensions operatively associated with said spraying means to provide a path of movement for said spraying means curved in two dimensions, said curved path having a curvature component of motion parallel to the curvature of said supported curved sheet and a transverse component of motion defining a curved line in a plane projected on the surface to be coated, and means operatively associated with said spraying means to adjust the orientation of said spraying means in response to its movement along said path curved in two dimensions so that the spray impinges on a portion only of the curved glass surface in a substantially constant angle of incidence thereto.

Other objects and advantages of the invention will appear below.

The invention will be described by way of illustration and without limitation with reference to the drawings wherein:

FIG. 1 shows a partially coated backlight produced by the present invention;

FIG. 2 is a side view, partially in section, of a coating apparatus and a glass-bending lehr associated therewith;

FIG. 3 is a view of the coating apparatus of FIG. 2 looking in the direction of the arrows III—III of FIG. 2;

FIGS. 5 to 10 show details of the coating apparatus of FIG. 2.

Figure 4:
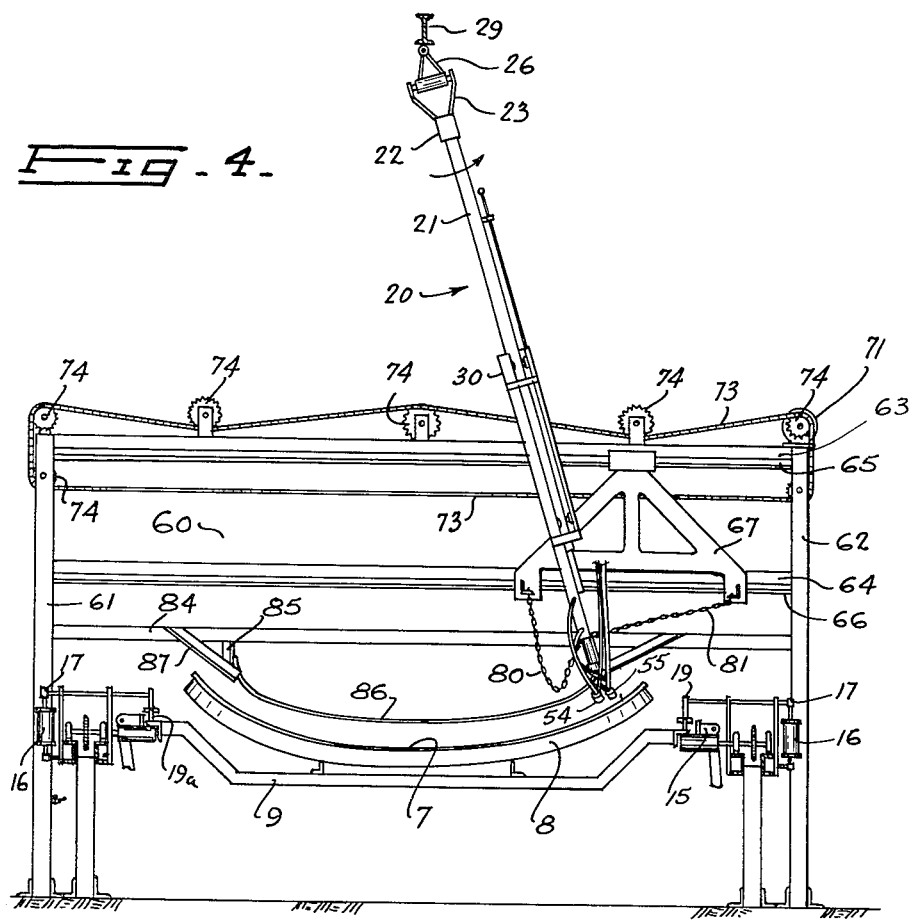
FIG. 4 is another view of the coating apparatus of FIG. 2 generally similar to that of FIG. 3.

FIG. 1 shows a backlight 1 having two simple longitudinal bends 2. The backlight 1 has a coated portion 3 separated from the remaining, uncoated portion 4 of the glass by a sharp cut-off line 5 and is typical of the partially coated, curved glass sheets obtainable by means of the invention.

FIG. 2 shows a glass bending lehr 6 of conventional type. Through the lehr 6 are pattern-cut glass sheets 7 supported on molds 8, the high temperature within the lehr causing the sheets 7 to bend and conform with the shaping surfaces of the molds 8. The molds 8 are mounted on carriage 9 and are conveyed through the lehr 6 by intermittent operation of a roller conveyor 10. The lehr 6 is provided with a door 11 which automatically opens upon operation of the conveyor 10 so that a mold 8 which has completed its travel through the lehr 6 can emerge from the lehr to be received by a conveyor 12 situated outside the lehr and aligned with the conveyor 10. Suitable mechanism for effecting such cooperative action of the conveyor 10 and the door 11 is well known and will not be described.

The conveyor 12 is provided with a driving mechanism which is interconnected with that of the conveyor 10 in such a manner that when an assembly of mold 8 and mold carriage 9 is delivered from the conveyor 10 to the conveyor 12 the latter is actuated and the assembly is moved along by the conveyor 12 until it arrives at a coating station a short distance from the lehr 6. Upon arrival of the mold 8 at the coating station it is necessary that the mold and its associated carriage 9 should be properly positioned before a coating operation can be carried out. This is effected by means of a positioning and orienting apparatus which is described in the copending application Serial No. 55,758 of William Bentley for "Positioning and Orienting Apparatus," filed September 13, 1960, to which reference may be made for a detailed description of this apparatus. For the sake of clarity, the only elements of the positioning and orienting apparatus shown (see FIG. 3) are a pair of elongated centering members 15 adapted to engage the lateral edges of the carriage 9 and center the carriage upon the conveyor 12, cylinders 16 carrying piston rods 17 connected through crank arms to spindles 18 on the inner ends of which are mounted depending stop arms 19. The stop arms 19 co-act with fingers 19a extending upwardly from the mold carriage 9.

When the assembly of mold 8 and its carriage 9 is moved into the coating station the stop arms 19 are in the lowered position so that the assembly is arrested due to contact of the fingers 19a with the stop arms 19. The conveyor 12 is then switched off and the elongated centering members 15 are actuated so as to move inwardly and center the carriage 9 upon the conveyor 12. In this manner the glass sheet 7 is so positioned that the subsequent coating operation will accurately coat the portion of the glass sheet 7 which is intended to receive the coating. The elongated centering members 15 are then withdrawn and the stop arms 19 are raised so that further passage of the assembly along the conveyor 12, subsequent to the coating operation, is unimpeded.

Above the coating station there is a suspended a telescopic arm 20 (see FIGS. 5 and 6). The upper portion of this arm 20 comprises a square shaft 21 which has a collar 22 welded to its upper end. From the collar 22 extend arms 23 which are secured to the ends of a shaft 24 mounted for free rotation in bearings secured within a tube 25. Four struts 26 extend between the ends of the tube 25 and the ends of a shaft 27 mounted for free rotation in bearings fitted within a tube 28. The tube 28 is fixed to an overhead beam 29. The tubes 25 and 28, and hence the shafts 24 and 27, are at right angles to each other and are rigidly secured in this position by the struts 26. The manner of suspension of the square shaft 21 is therefore such that this shaft can swing about the shaft 24 or about the shaft 27 but cannot undergo any torsional movement about its own axis.

The lower part of the square shaft 21 is enclosed by a box-like structure 30 which forms the lower portion of the telescopic arm 20. The structure 30 is made up of two angle irons 31 and 32 held together by means of four right-angled straps 33. Ball transfers 34 are secured within the angle irons 31 and 32 adjacent the ends thereof so that at each end of the box-like structure 30 a ball transfer 34 is in contact with each of the surfaces of the shaft 21. This arrangement permits free linear movement of the box-like structure 30 relative to the square shaft 21 while preventing any torsional movement of these members relative to each other.

A collar 35 secured to the lower end of the shaft 31 increases the mass, and therefore the moment of inertia of the telescopic arm 20.

As a safeguard against the possibility that the box-like structure 30 can fall downwardly and become detached from the shaft 21 there is provided a rod 36 which extends upwardly from the angle iron 32, passing freely through an aperture in a plate 37 secured to the square shaft 21, the rod 36 having at its upper end a head 38 bigger than the aperture in the plate 37.

To the lower end of angle iron 31 is secured a short piece of angle iron 40 (FIG. 8) which is fixed to the closed upper end of a cylindrical body 41. Within the cylindrical body 41 there is mounted in radial bearings 42 a shaft 43 carrying at its lower end a disc 44. A thrust bearing 45 is interposed between the disc 44 and the open lower end of the cylindrical body 41. Two plates 46, each carrying a ball transfer 47 extend from the disc 44 at an angle to each other. A safety hook 48 is secured to one of the plates 46 and extends downwardly therefrom.

Figure 10:
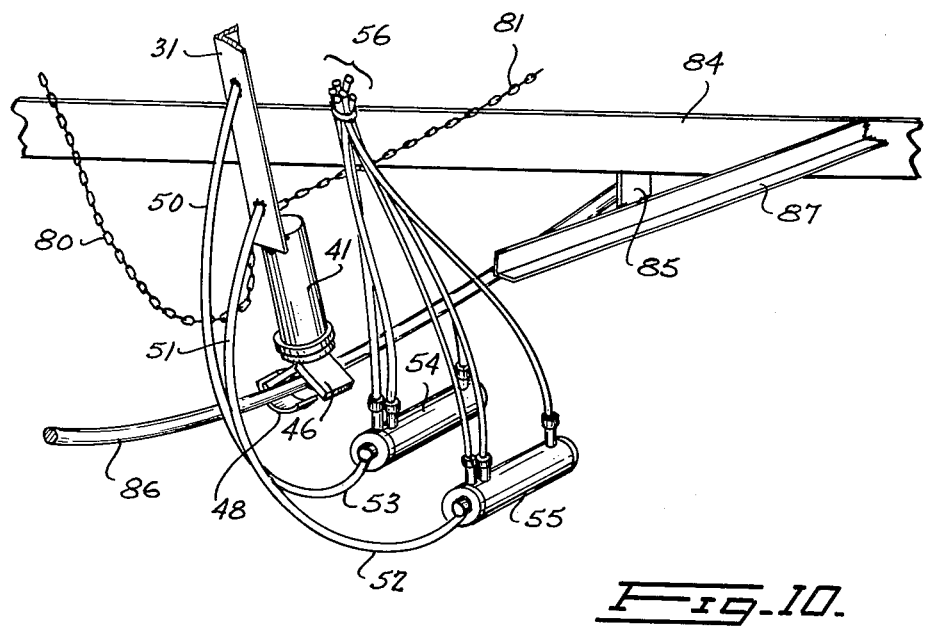

Also secured to the angle iron 31 is a rod 50 reinforced by a strut 51 (FIG. 10). The rod 50 carries at its lower end two arms 52 and 53 on which are supported spray heads 54 and 55 respectively, each shrouded in a tubular housing, the spray head 55 being positioned slightly lower than the spray head 54.

Three hoses 56 are connected to each spray head. One hose is for supplying a coating composition, a second is for supplying pressurized air to atomize the coating composition and eject it from the spray head in the form of a spray and a third is in an air line by means of which a pneumatically controlled valve within the spray head is operated to initiate or terminate spraying. The structural details of the spray heads are not illustrated since they are not part of the present invention.

The coating station is bounded by a frame 60 (FIG. 4) comprising two upright members 61 and 62 and horizontal members 63 and 64. Two fixed shafts 65 and 66 extend horizontally between the upright members 61 and 62. A triangular plate 67 is mounted for horizontal movement on the shafts 65 and 66 (FIG. 9) upon blocks 68, 69 and 70 secured to the corners of the triangular plate. Within each of the blocks 68, 69 and 70 there is accommodated a bearing bushing which ensures free sliding movement between the plate 67 and the shafts 65 and 66.

Figure 9:
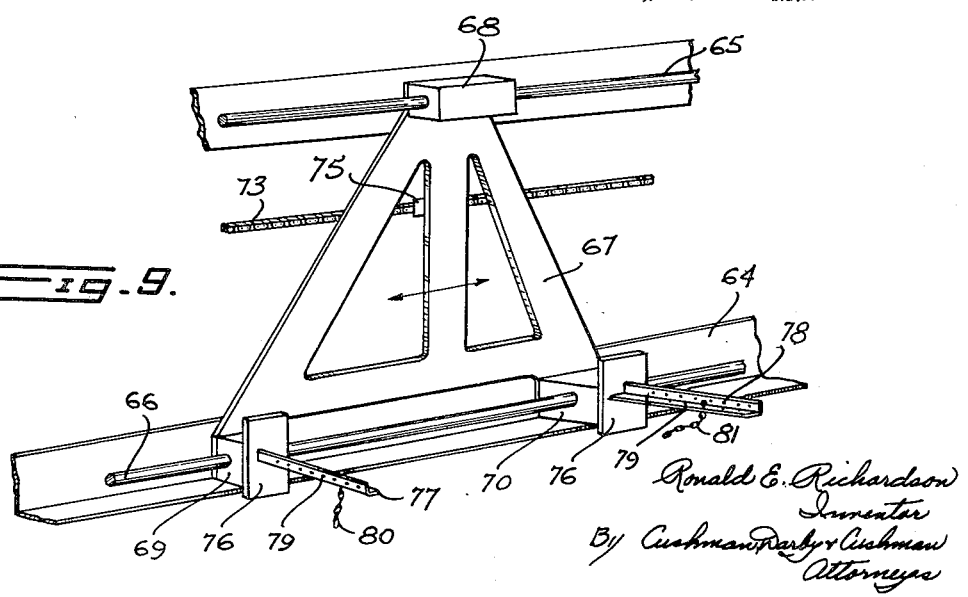

An electric motor 71 is mounted on a bracket 72 (FIG. 2) secured to the upright member 62. The motor 71 drives a chain 73 which passes about sprockets 74 mounted on the frame 60. The chain 73 is secured at each end to a block 75 fixed to the triangular plate 67 (FIG. 9). Thus, when the electric motor 71 is switched on the triangular plate 67 is caused to move linearly across the frame 60 upon the shafts 65 and 68.

Plates 76 are secured to the blocks 69 and 70 and angle irons 77 and 78 extend at right angles from the plates 76. The angle irons 77 and 78 are provided with a series of holes 79 affording means for attaching one end of each of two chains 80 and 81. The other ends of the chains 80 and 81 are secured to the lower end of the angle iron 31 which forms part of the box-like structure 30.

A horizontal rail 84 extends across the frame 60. From the rail 84 depend two short pieces of angle iron 85 to which are secured the ends of a cam rail 86 of circular cross-section. Struts 87 ensure that the cam rail 86 is rigidly secured relative to the rail 84. As can be seen most clearly from FIG. 8 the cam rail 86 supports the lower end of the telescopic arm 20, the ball transfers 47 bearing against the opposite upper surfaces of the rail 86. The curvature of the cam rail 86 is such that the projection thereof in a vertical plane is substantially parallel to the longitudinal curvature of the glass sheet 7 and provides a component of direction in said vertical planes substantially parallel to said longitudinal curvature and its projection in a horizontal plane is substantially parallel with the projection in a horizontal plane of the desired cut-off line on the glass sheet 7 to provide a second component of direction defining said desired cut-off line on the upper concave surface of the curved glass sheet.

The manner in which the glass sheet 7 is coated at the coating station will now be described. As explained above, immediately upon arrival at the coating station the sheet 7 is properly positioned and oriented by means of the apparatus of Serial No. 55,758 mentioned hereinabove. The switching mechanism which causes raising of the stop arms 19 and retraction of the centering members 15 is also adapted to switch on the electric motor 71 after the sheet 7 has been properly positioned. The motor 71 drives the chain 73 about the sprocket 74 and hence causes the triangular plate 67 to move from the position shown in FIG. 4 to a corresponding position at the opposite end of the cam rail 86.

In the position of FIG. 4 the chain 81 is taut and serves to hold the telescopic arm 20 in the position illustrated against the weight of the arm 20 which tends to cause the arm to move towards the centre position shown in FIG. 3. As soon as the triangular plate 67 moves to the left from its position of FIG. 4 the chain 81 slackens slightly whereupon the arm 20 begins to move under the influence of gravity, its lower end following the arcuate path defined by the cam rail 86. Since this path is directed away from the triangular plate 67 the chain 81 is soon tautened again; from then on the gravity fall of the arm 20 is restrained by the chain 81 and continues to be so restrained until the arm almost reaches the midpoint of the cam rail 86. During the whole of this movement the chain 80 is slack and it remains so until the arm 20 has moved a short distance beyond the midpoint of the cam rail 86 which it does by virtue of the kinetic energy it has acquired during its controlled descent of the right hand portion of the cam rail as viewed in FIG. 4. Thus when the arm 20 is in the position shown in FIG. 3 neither of the chains is taut or is exercising any influence on the movement of the arm 20. As soon as the arm 20 has moved the aforementioned short distance beyond the midpoint of the cam rail 86 the lateral movement of the arm 20 is lagging sufficiently behind the lateral movement of the triangular plate 37 that the chain 80 becomes taut. From then on, the chain 80 pulls the arm 20 along and up the path defined by the left hand portion of the cam rail 86 as viewed in FIG. 4. Finally the arm 20 has moved from the position of FIG. 4 to a corresponding position towards the other side of the frame 60. During movement of the telescopic arm 20 the ball transfers 47 follow the surface of the cam rail 86, the shaft 43 undergoing such rotation as is necessary to make this possible. The length of the telescopic arm 20 is continually adjusted in length by movement of the box-like structure 30 relative to the square shaft 21. The thrust bearing 45 prevents the weight of the arm 30 from inhibiting free rotational movement of the shaft 43 and its associated disc 44. This manner of mounting the telescopic arm 20 for movement along the cam rail 86 ensures that the arm can reliably follow the cam rail despite the fact that no torsional movement of the box-like structure 30 is possible. The spray heads 54 and 55 are at all times directed toward the upper surface of the glass sheet 7.

Simultaneously with the actuation of the electric motor 71 a compressor is switched on which actuates the pneumatically-controlled valves in the spray heads 54 and 55 and causes a coating composition to be sprayed from the spray heads 54 and 55. This spraying continues until the telescopic arm 20 has completed its travel from adjacent one end to adjacent the other of the cam rail 86. The two spray heads 54 and 55 are so positioned that together they serve to apply a coating to all of the portion of the glass sheet 7 which is desired to coat. The cut-off line between the coated and uncoated portions of the sheet is traced out by the lower spray head 55.

When the telescopic arm 20 has reached the limit of its path of movement on the cam rail 86 and the application of the coating composition to the glass has been completed, the electric motor 71 is switched off so that movement of the triangular plate 67 and the arm 20 ceases. Simultaneously, the compressor is switched off so that the spraying of the coating composition from the spray heads 54 and 55 also ceases. The drive between the electric motor 71 and the chain 73 is then automatically reversed and the immediately subsequent actuation of the electric motor 71 causes the triangular plate 67 to move back across the frame 60 to the position of FIG. 4. The telescopic arm 20 is also moved back to the position of FIG. 4 by the tension exerted by the plate 67 on the chain 81.

The time elapsing between the emergence of the glass sheet 7 from the lehr 6 and the application to it of the coating composition by the sequence of events just described is fairly short so that the glass sheet surface is still hot enough to effect the necessary chemical reaction involving the coating composition. After return of the arm 20 to the position of FIG. 4 the conveyor 12 is switched on again, if desired automatically, and the sheet 7 together with mold 8 and carriage 9 move past the frame 60 to an unloading station (not shown) where the sheet 7 is lifted from the mold 8 and allowed to cool in air.

It will be appreciated that the cam rail 86 is provided with a curvature defined in accordance with the curvature of the glass sheet 7, the dimensions of the portion of the sheet 7 to which a coating is to be applied and the general dimensions and disposition of the apparatus. If a sheet of different curvature is to be treated or if the area of the sheet to be coated is changed it is necessary to replace the cam rail 86 by a cam rail having a curvature in accordance with the modified operating conditions.

The cam rail 86 serves as means guiding movement of the spray means (spray heads 54 and 55) along a path curved in two dimensions. The path comprises a longitudinal component of motion curved in a direction parallel to the longitudinal curvature of the glass sheet and a transverse component of motion defining a curved path in a plane projected on the curved surface to be coated. When the glass sheet is supported horizontally, the cam 86 guides movement of the spray means in such a path that the spray origin is maintained at a fixed vertical distance from the glass sheet surface while moved in an arcuate path in a horizontal plane parallel with the desired cut-off line on the glass sheet in a projection in a horizontal plane intersecting the glass sheet. It is understood, however, that the terms "vertical" and "horizontal" as used herein are merely reference planes for an operation wherein the sheet is supported in a horizontal plane. It is obvious that the illustrative apparatus may be modified to spray a curved glass sheet supported either vertically or in an oblique plane.

Many changes can be made to the apparatus and method described within the scope of the invention. For example the two spray heads 54 and 55 might in a particular case be adequately replaced by a single spray head or on the other hand more than two spray heads could be used. Also it might be desirable to arrange that the telescopic arm 20 and the associated spray head or spray heads make more than one pass across the frame 60, coating composition being sprayed on to the sheet during each pass. This expedient could be used with particular advantage in a case where it is desired to provide a graded effect on the portion of the sheet being coated. For example, the co-action between the conveyor 12 and the positioning and orienting apparatus which is the subject of the aforementionel copending application Serial No. 55,758 could be modified so as to effect step-wise furthering of the glass sheet 7 along the conveyor 12 between each pass and the pressure under which the coating composition is sprayed from one or more spray heads could be progressively increased (or the sizes of the orifices in the spray heads increased) from one pass to the next so that the thickness of the successive layers of coatings would increase to produce the desired effect.

Alternatively step-wise furthering of the sheet 7 could be dispensed with and a number of appropriately directed spray heads provided from each of which the coating composition is sprayed under a different pressure. During the first pass a low pressure spray would be used to deposit a thin layer of the coating and during subsequent passes higher pressure sprays would be successively used to deposit progressively thicker layers of coating to produce the desired graded effect.

Various combinations of these features of actuating selected spray heads only during a pass, changing the operating pressure or orifice size of a spray head between passes and effecting stepwise furthering of the glass sheet 7 to produce desired coating patterns are clearly feasible.

Also it is clear that the process of the invention can be carried out using convex rather than concave moulding surfaces to support the glass sheets during the coating operation.

In the illustrative embodiment described hereinabove the molds 8 and carriages 9 serve as glass sheet supporting means, the spray heads 54 and 55 and their associated hoses 56 serve as spraying means, the cam rail 86 serves as guiding means, the telescopic arm 20 and the triangular plate 67 interconnected by chains 80 and 81 serve as means for moving the spraying means, the cylindrical body 41 and its associated parts including the plates 46 and ball transfers 47 serve as carriage means, the conveyor 12 serves as conveyor means for moving the glass sheet to a position adjacent the spraying means, the positioning and orienting apparatus comprising the parts 15, 16, 17, 18 and 19 serve as means for positioning and orienting the glass sheet relative to the spray means, and the mounting of the top end of the telescopic arm 20 and the rigid connection between angle iron 31 and spray heads 54 and 55 through rod 50 and arms 52 and 53 serve as means to adjust the orientation of the spraying means in response to movement of the latter in the curved path defined by the guiding means constituted by the cam rail 86.

I claim:

1. A method of coating a portion of the surface of a curved glass sheet comprising supporting said sheet with a portion only of its curved surface disposed in the path of a spray, directing a spray of a coating composition along an axis extending from an origin towards said curved surface, moving said spray origin relative to said curved surface in a path curved in two dimensions while continuing to direct said spray towards said curved surface, the movement of said spray origin in said curved path having a first component of motion substantially parallel to the curvature of said sheet and a second component of motion defining a curved line in a plane projected on said curved surface, and adjusting the axis of the spray during the movement of said spray origin relative to said curved surface so that the spray impinges on said curved surface at a substantially constant angle of incidence.

2. A method of coating a portion of the concave surface of a longitudinally curved glass sheet to provide on said concave surface a coated area symmetrical about the transverse axis of said sheet and separated from an uncoated area by a curved cut-off line comprising supporting said sheet generally horizontally with a portion only of its longitudinally curved surface disposed in the path of a spray, directing a spray of a coating composition along an axis extending from an origin towards said concave surface, moving said spray origin relative to said concave surface in a path curved in two dimensions while continuing to direct said spray towards said curved surface, the movement of said spray origin in said curved path having a first component of motion substantially parallel to the longitudinal curvature of said sheet and a second component of motion defining a curved line symmetrical about said transverse axis in a plane projected on said concave surface, and adjusting the axis of the spray during the movement of said spray origin relative to said curved surface so that the spray impinges on said concave surface at a substantially constant angle of incidence.

3. A method of coating a portion of the concave surface of a longitudinally curved glass sheet comprising supporting said sheet generally horizontally with its concave surface uppermost and with a portion only of its concave surface disposed in the path of a spray, directing a spray of a coating composition along an axis extending from an origin towards said concave surface, moving said spray origin relative to said concave surface in a path curved in two dimensions while continuing to direct said spray towards said concave surface, the movement of said spray origin in said curved path having a first component of motion in a substantially vertical plane and substantially parallel to the longitudinal curvature of said sheet and a second component of motion in a generally horizontal plane and defining a curved line in a plane projected on said concave surface, and adjusting the axis of the spray during the movement of said spray origin relative to said concave surface so that the spray impinges on said concave surface at a substantially constant angle of incidence.

4. Apparatus for spraying a band of coating on a surface of a curved glass sheet comprising spraying means, means for supporting a curved glass sheet in a position adjacent said spraying means, means operatively connected to said spraying means for moving said spraying means relative to the curved surface of said sheet while applying a spray through said spraying means, guiding means curved in two dimensions operatively associated with said spraying means to provide a path of movement for said spraying means curved in two dimensions, said curved path having a first component of direction parallel to the curvature of said supported curved sheet and a second component of direction defining a curved line in a plane projected on said curved surface, and means operatively associated with said spraying means to adjust the orientation of said spraying means in response to its movement in said curved path so that the spray impinges on a portion only of the curved glass surface at a substantially constant angle of incidence thereto.

5. Apparatus for spraying a band of coating on a concave surface of a longitudinally curved glass sheet to provide on said concave surface a coated area symmetrical about the transverse axis of said sheet and separated from an uncoated area by a curved cut-off line, comprising spraying means, means for supporting said curved glass sheet generally horizontally with its concave surface uppermost in a position adjacent said spraying means, means operatively connected to said spraying means for moving said spraying means relative to said concave surface while applying a spray through said spraying means, guiding means curved in two dimensions operatively associated with said spraying means to provide a path of movement for said spraying means curved in two dimensions, said curved path having a first component of direction substantially parallel to the longitudinal curvature of said sheet and a second component of direction defining a curved line symmetrical about said transverse axis in a plane projected on said concave surface, and means operatively associated with said spraying means to adjust the orientation of said spraying means in response to its movement in said curved path so that the spray impinges on a portion only of the curved glass surface at a substantially constant angle of incidence thereto.

6. Apparatus for spraying a band of coating on a concave surface of a longitudinally curved glass sheet comprising spraying means, means for supporting said curved glass sheet generally horizontally with its concave surface uppermost in a position adjacent said spraying means, means operatively connected to the spraying means for moving said spraying means relative to said concave surface while applying a spray through said spraying means, guiding means curved in two dimensions operatively associated with said spraying means to provide a path of movement for said spraying means curved in two dimensions, said curved path having a first component of direction in a substantially vertical plane and substantially parallel to the longitudinal curvature of said sheet and a second component of direction in a generally horizontal plane and defining a curved line in a plane projected on said concave surface, and means operatively associated with said spraying means to adjust the orientation of said spraying means in response to its movement in said curved path so that the spray impinges on a portion only of said concave surface at a substantially constant angle of incidence thereto.

7. Apparatus for spraying a band of coating on a concave surface of a longitudinally curved glass sheet comprising spraying means, means for supporting a curved glass sheet generally horizontally adjacent said spray means with its concave surface uppermost, a telescopic arm extending downwardly above said concave surface and mounted for torsion-free movement about its upper end longitudinally and transversely of said sheet, said spray means being rigidly connected to said telescopic arm, carriage means connected to the lower end of said telescopic arm and axially rotatable relative thereto, cam means curved in two dimensions providing a curved path of movement for said spraying means, said curved path having a longitudinal component of direction substantially parallel with the longitudinal curvature of said sheet and a transverse component of direction defining a curved line in a plane projected on said concave surface, and means for moving said carriage means in said curved path.

8. Apparatus according to claim 7 wherein said means for moving said carriage means in said curved path comprises a reciprocable member mounted for movement substantially parallel to the longitudinal axis of said supported sheet and secured to said telescopic arm by spaced tensionable members extending between said reciprocable member and said telescopic arm.

9. Apparatus according to claim 8 having rigid arms extending from said reciprocable member substantially at right angles thereto, said tensionable members extending between said rigid arms and said telescopic arm.

10. Apparatus according to claim 7 wherein said cam means comprises a rail of substantially circular cross section and said carriage means comprises a pair of ball transfers, said ball transfers being in contact with opposite upper sides of said rail.

11. Apparatus according to claim 7 wherein said telescopic arm has an upper portion comprising a rigid shaft and a lower portion comprising a hollow member enclosing and in slidable engagement with a lower portion of said rigid shaft, said hollow member having a downward extension to which said carriage means is secured.

12. Apparatus for spraying a band of coating on a surface of a longitudinally curved glass sheet comprising spraying means, conveyor means for moving a curved glass sheet into a position adjacent said spraying means, means for supporting said curved glass sheet in said position, with its concave surface uppermost, means for positioning and orienting said curved glass sheet relative to said spraying means operatively connected to said conveyor means, means operatively connected to said spraying means for moving said spraying means relative to the concave surface of said sheet while applying a spray through said spraying means, guiding means curved in two dimensions operatively associated with said spraying means to provide a path of movement for said spraying means curved in two dimensions, said curved path having a longitudinal component of direction parallel to the longitudinal curvature of said supported curved sheet and a transverse component of direction defining a curved line in a plane projected on said concave surface, and means operatively associated with said spraying means to adjust the orientation of said spraying means in response to its movement along said curved path so that the spray impinges on a portion only of the curved glass surface at a substantially constant angle of incidence thereto.

References Cited in the file of this patent
UNITED STATES PATENTS

| | | |
|---|---|---|
| 2,245,932 | Miller | June 17, 1941 |
| 2,344,108 | Roselund | Mar. 14, 1944 |
| 2,721,809 | Marks et al. | Oct. 25, 1955 |